(12) United States Patent
Akishiba et al.

(10) Patent No.: US 10,066,932 B2
(45) Date of Patent: Sep. 4, 2018

(54) SHAPE MEASURING DEVICE

(71) Applicant: Keyence Corporation, Osaka (JP)

(72) Inventors: Yuji Akishiba, Osaka (JP); Takashi Atoro, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/696,199

(22) Filed: Sep. 6, 2017

(65) Prior Publication Data
US 2018/0100732 A1      Apr. 12, 2018

(30) Foreign Application Priority Data

Oct. 12, 2016   (JP) .................................. 2016-201048

(51) Int. Cl.
*G01B 11/02*     (2006.01)
*G01B 11/24*     (2006.01)
*G01B 11/30*     (2006.01)

(52) U.S. Cl.
CPC .......... *G01B 11/2441* (2013.01); *G01B 11/30* (2013.01)

(58) Field of Classification Search
CPC ..... G01B 11/24; G01B 11/30; G01B 11/2441; G01B 9/02; G01B 9/02034
See application file for complete search history.

(56) References Cited

U.S. PATENT DOCUMENTS

2016/0131474 A1* 5/2016 Saeki .................. G01B 9/0205
                                                                356/511

FOREIGN PATENT DOCUMENTS

JP      2013-083649      5/2013

OTHER PUBLICATIONS

U.S. Appl. No. 15/696,229, filed Sep. 6, 2017 (112 pages).

* cited by examiner

*Primary Examiner* — Jamil Ahmed
(74) *Attorney, Agent, or Firm* — Kilyk & Bowersox, P.L.L.C.

(57) ABSTRACT

To provide a shape measuring device capable of measuring a surface shape of a measuring object at high speed and with high accuracy in a wide measurement range while configuring the shape measuring device compact. A movable section 141 and a balancing section 142 are supported by a supporting section 125 and reciprocatingly moved by a driving unit 150 with respect to the supporting section 125 in opposite directions each other.

15 Claims, 10 Drawing Sheets

SHAPE MEASURING DEVICE

CROSS-REFERENCE TO RELATED APPLICATIONS

The present application claims foreign priority based on Japanese Patent Application No. 2016-201048, filed Oct. 12, 2016, the contents of which is incorporated herein by reference.

BACKGROUND OF THE INVENTION

1. Field of the Invention

The present invention relates to a shape measuring device that measures a surface shape of a measuring object.

2. Description of Related Art

A shape measuring device of an interference type is used in order to measure a surface shape of a measuring object.

In a coherence scanning interferometer described in JP-A-2013-83649, light generated from a light source is divided into measurement light irradiated on an object and reference light irradiated on a reference mirror. The measurement light reflected by the object and the reference light reflected by the reference mirror are superimposed and detected by a camera. In a state in which an optical system including the light source and the camera is moved relatively to the object, an image is acquired by the camera. A surface height of the object is calculated on the basis of an interval of interference fringes in the acquired image.

SUMMARY OF THE INVENTION

The shape measuring device is desired to measure a surface shape of a measuring object at high speed in a wide measurement range. However, in the coherence scanning interferometer describe in JP-A-2013-83649, when a moving range of the optical system is increased in order to expand the measurement range or moving speed of the optical system is increased in order to accelerate the measurement, vibration of the entire shape measuring device increases. In order to prevent such vibration, it is necessary to increase the shape measuring device in size and weight. For that reason, it is difficult to measure the surface shape of the measuring object at high speed in the wide measurement range while configuring the shape measuring device compact.

An object of the present invention is to provide a shape measuring device capable of measuring a surface shape of a measuring object at high speed and with high accuracy in a wide measurement range while configuring the shape measuring device compact.

(1) A shape measuring device according to the present invention is a shape measuring device that measures a surface shape of a measuring object, the shape measuring device including: a light projecting section configured to emit light having a plurality of peak wavelengths; a reference body; a first light receiving section including a two-dimensionally arrayed plurality of pixels; an optical system configured to guide the light emitted by the light projecting section to the measuring object as measurement light, guide the light emitted by the light projecting section to the reference body as reference light, generate interference light of the measurement light reflected by the measuring object and the reference light reflected by the reference body, and guide the generated interference light to the first light receiving section; a movable section to which at least one of the optical system and the reference body is attached, the movable section reciprocatingly moving to thereby change a difference between an optical path length of the measurement light and an optical path length of the reference light; a supporting section configured to support the movable section to be capable of reciprocatingly moving; a position detecting section configured to detect relative positions of the movable section with respect to the supporting section; a shape acquiring section configured to acquire surface shapes of a plurality of portions of the measuring object on the basis of the relative positions detected by the position detecting section and light receiving amounts of the plurality of pixels of the first light receiving section; a balancing section supported to be capable of reciprocatingly moving with respect to the supporting section; and a first driving section configured to reciprocatingly move the movable section and the balancing section with respect to the supporting section in opposite directions each other.

In the shape measuring device, the movable section and the balancing section are supported by the supporting section. At least one of the optical system and the reference body is attached to the movable section. The light emitted by the light projecting section is guided to the measuring object as the measurement light. The light emitted by the light projecting section is guided to the reference body as the reference light. The interference light of the measurement light reflected by the measuring object and the reference light reflected by the reference body is generated by the optical system and guided to the first light receiving section.

The movable section is reciprocatingly moved by the first driving section, whereby the difference between the optical path length of the measurement light and the optical path length of the reference light (hereinafter referred to as optical path length difference) changes. An interference pattern of the light receiving amount that changes according to the optical path length difference is acquired from each of the plurality of pixels of the first light receiving section. Since the measurement light and the reference light have pluralities of peak wavelengths, the interference pattern of the light receiving amount does not show spatial periodicity. Therefore, it is possible to uniquely specify, with high accuracy, on the basis of the relative positions of the movable section with respect to the supporting section detected by the position detecting section and the light receiving amounts of the pixels of the first light receiving section, surface shapes of portions of the measuring object corresponding to the relative positions and the light receiving amounts.

In the first light receiving section, since the plurality of pixels are two-dimensionally arrayed, the first light receiving section can simultaneously receive the interference light including the measurement light reflected by a plurality of portions of the measuring object. For that reason, it is possible to acquire surface shapes of the plurality of positions of the measuring object at high speed.

Further, the balancing section is reciprocatingly moved by the first driving section in the opposite direction of the movable section with respect to the supporting section. In this case, even if the movable section reciprocatingly moves, the position of the center of gravity of the shape measuring device hardly changes. For that reason, the shape measuring device does not unstably vibrate. It is unnecessary to increase the shape measuring device in size and weight. It is possible to vibrate the movable section at high speed and with large amplitude. As a result, it is possible to measure the surface shape of the measuring object at high speed and with high accuracy in a wide measurement range while configuring the shape measuring device compact.

(2) The light projecting section may emit light having coherency higher than the coherency of white light and lower than the coherency of laser light. In this case, the interference pattern of the light receiving amounts is acquired from the plurality of pixels of the first light receiving section in a wide region of the optical path length difference. Consequently, it is possible to measure the surface shape of the measuring object at higher speed.

(3) The shape measuring device may further include an elastic member configured to connect the movable section and the balancing section. In this case, the movable section and the balancing section easily vibrate. Consequently, it is possible to reduce energy given to the first driving section in order to reciprocatingly move the movable section and the balancing section.

(4) A reciprocating mechanism may be configured by the elastic member, the movable section, and the balancing section. A spring constant of the elastic member may be set such that a natural frequency of the reciprocating mechanism is in a fixed range from a vibration frequency of the reciprocating mechanism. In this case, simple harmonic oscillation of the movable section and the balancing section is maintained by the elastic member. Consequently, it is possible to minimize the energy given to the first driving section in order to vibrate the movable section and the balancing section.

(5) The first driving section may be attached between the movable section and the balancing section to be mechanically insulated from the supporting section. In this case, vibration by the first driving section is not transmitted to the supporting section. Consequently, it is possible to further stabilize the shape measuring device.

(6) The shape measuring device may further include first and second sliding sections configured to be capable of sliding in parallel to one direction. The movable section and the balancing section may be respectively attached to the supporting section via the first and second sliding sections to be capable of reciprocatingly moving. In this case, a direction of reciprocating motion of the movable section and the balancing section is restricted to be parallel to the one direction. Consequently, it is possible to further stabilize the shape measuring device.

(7) The shape measuring device may further include: a third sliding section configured to be capable of sliding in parallel to one direction; a plate section supported to be capable of reciprocatingly moving with respect to the supporting section; and a second driving section configured to reciprocatingly move the plate section with respect to the supporting section. Each of the first, second, and third sliding sections may be a linear motion bearing. The first sliding section may be provided in the movable section and on one surface of the plate section. The second sliding section may be provided in the balancing section and on the one surface of the plate section. The third sliding section may be provided on the other surface of the plate section and in the supporting section. The second driving section may reciprocatingly move the plate section such that a rolling member in each of the first, second, and third sliding sections rolls one round or more.

In this case, a situation is prevented in which only a portion of the rolling member in each of the first, second, and third sliding sections comes into contact with a contact portion of the linear motion bearing. Lubricant for smoothing the motion of the rolling member can be circulated around the rolling member. Consequently, it is possible to prevent seizure of the first, second, and third sliding sections and extend the life of the shape measuring device.

(8) The plate section may include first, second, and third portions. An interval between one surface of the first portion and the movable section may be larger than an interval between one surface of the third portion and the movable section. An interval between one surface of the second portion and the balancing section may be larger than an interval between the one surface of the third portion and the balancing section. An interval between the other surface of the third portion and the supporting section may be larger than an interval between the other surface of the first portion and an interval between the other surface of the second portion and the supporting section. The first sliding section may be provided on the one surface of the first portion. The second sliding section may be provided on the one surface of the second portion. The third sliding section may be provided on the other surface of the third portion.

In this case, since the first and second portions of the plate section do not further project in the direction of the movable section and the balancing section than the third portion, a projection amount of the first and second sliding section in the direction decreases. Since the third portion of the plate section does not further project in a direction of the supporting section than the first and second portions, a projection amount of the third sliding section in the direction decreases. Consequently, it is possible to prevent the shape measuring device from being increased in size while extending the life of the shape measuring device.

(9) Cycles of the reciprocating movement of the movable section may include a first period in which the plurality of pixels of the first light receiving section receive the interference light and a second period in which the plurality of pixels of the first light receiving section do not receive the interference light. The second driving section may move the plate section in the second period and stop the movement of the plate section in the first period. In this case, the measurement of the measuring object is easily prevented from being affected by the movement of the plate section.

(10) The shape measuring device may further include a guide section configured to emit first and second guide lights. The guide section may be disposed such that, when a surface of the measuring object is present in a position of a focal point of the first light receiving section, a pattern of the first guide light and a pattern of the second guide light projected on the surface of the measuring object have a specific positional relation.

In this case, a user can accurately and easily locate the surface of the measuring object at the focal point of the first light receiving section by changing a relative distance between the shape measuring device and the measuring object such that the pattern of the first guide light and the pattern of the second guide light projected on the surface of the measuring object are in the specific positional relation.

(11) Cycles of the reciprocating movement of the movable section may include a third period in which the plurality of pixels of the first light receiving section receive the interference light and a fourth period in which the plurality of pixels of the first light receiving section do not receive the interference light. The guide section may emit the first and second guide lights in the third period and stop the emission of the first and second guide lights in the fourth period. In this case, the measurement of the measuring object is easily prevented from being affected by the first and second guide lights.

(12) The shape measuring device may further include a shaping member configured to transmit the light emitted by the light projecting section while shaping a pattern of the light into a circular shape. In this case, circular measurement light is irradiated on the measuring object. Consequently, it is possible to measure surface shapes of a plurality of portions in a circular region of the measuring object at high speed.

(13) The shape measuring device may further include a second light receiving section configured to receive reflected light from the shaping member and detect a light receiving amount. In this case, it is possible to manage a light amount of the light emitted by the light projecting section using light reflected by the shaping member and not used for the measurement of the surface shape of the measuring object.

(14) The position detecting section may be configured to further detect an absolute position of the movable section. In this case, it is possible to measure the distance from the shape measuring device to the measuring object.

(15) The first light receiving section may specify, concerning each of the plurality of pixels, an envelope of an interference pattern of the light receiving amount that changes according to the difference between the optical path length of the measurement light and the optical path length of the reference light. The shape acquiring section may specify a peak position of the envelope specified by the first light receiving section and acquire surface shapes of a plurality of portions of the measuring object on the basis of the specified peak position.

With this configuration, even when an interval of the optical path length difference at which the interference pattern should be acquired is not sufficiently dense but is rough, it is possible to specify the peak position of the interference pattern envelope. Consequently, it is possible to measure the surface shape of the measuring object at higher speed.

According to the present invention, it is possible to measure the surface shape of the measuring object at high speed and with high accuracy in a wide measurement range while configuring the shape measuring device compact.

DESCRIPTION OF EMBODIMENTS

(1) Basic Configuration of a Shape Measuring Device

Figure 1:
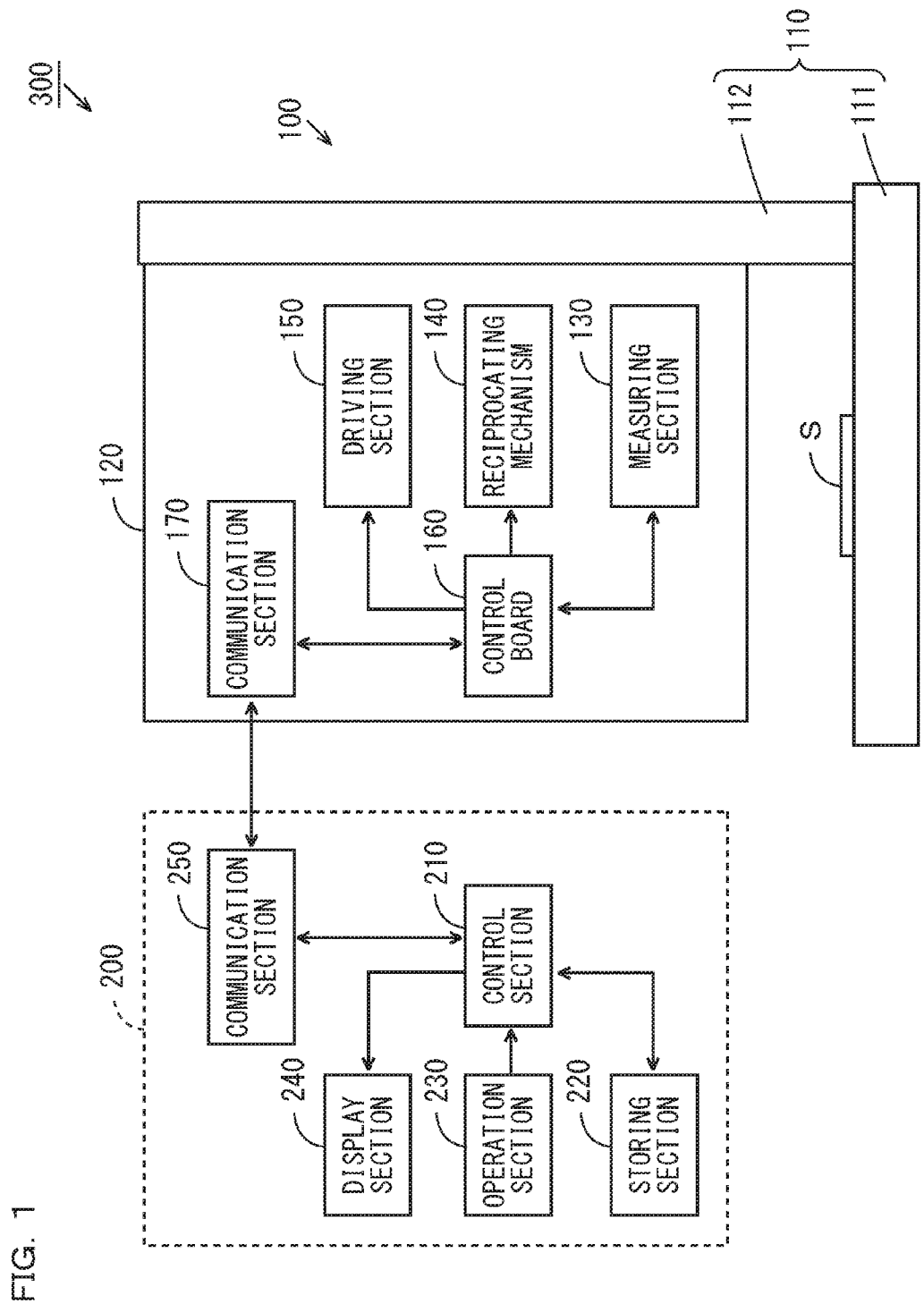
FIG. 1 is a block diagram showing the configuration of a shape measuring device according to an embodiment of the present invention.

A shape measuring device according to an embodiment of the present invention is explained below with reference to the drawings. FIG. 1 is a block diagram showing the configuration of a shape measuring device according to an embodiment of the present invention. As shown in FIG. 1, a shape measuring device 300 includes a measurement head 100 and a processing device 200. The measurement head 100 is, for example, an optical displacement gauge and includes a supporting structure 110, a housing unit 120, a measuring unit 130, a reciprocating mechanism 140, a driving unit 150, a control board 160, and a communication unit 170.

The supporting structure 110 has an L shape in longitudinal section and includes a setting section 111 and a holding section 112. The setting section 111 and the holding section 112 are formed of, for example, metal. The setting section 111 has a horizontal flat shape and is set on a setting surface. A measuring object S is placed on the upper surface of the setting section 111. The holding section 112 is provided to extend upward from one end portion of the setting section 111. The housing unit 120 is held by the holding section 112 of the supporting structure 110. The housing unit 120 has a rectangular parallelepiped shape and houses the measuring unit 130, the reciprocating mechanism 140, the driving unit 150, the control board 160, and the communication unit 170.

The measuring unit 130 includes a light projecting section, a light receiving section, and optical elements such as a lens and a mirror. The measuring unit 130 excluding a part of elements such as a mirror 11 shown in FIG. 2 explained below is attached to the reciprocating mechanism 140. The reciprocating mechanism 140 is reciprocatingly moved (vibrated) by the driving unit 150 in one direction with respect to a supporting section 125 shown in FIG. 2 explained below. The driving unit 150 is an actuator and, in this example, a voice coil motor.

The control board 160 acquires measurement data explained below from the measuring unit 130 and generates pixel data and generates image data on the basis of the acquired measurement data. The image data is a set of a plurality of pixel data. The control board 160 gives the generated image data to the processing device 200 and controls the operations of the measuring unit 130, the reciprocating mechanism 140, and the driving unit 150 on the basis of commands by the processing device 200.

The communication unit 170 includes a communication interface. The same applies to a communication unit 250 of the processing device 200 explained below. The communication unit 170 performs transmission and reception of various data and commands between the measurement head 100 and the processing device 200 through the communication unit 250. Details of the measurement head 100 are explained below.

The processing device 200 includes a control unit 210, a storing unit 220, an operation unit 230, a display unit 240, and a communication unit 250. The control unit 210 includes, for example, a CPU (Central Processing Unit). The storing unit 220 includes, for example, a ROM (Read Only Memory), a RAM (Random Access Memory), and a HDD (Hard Disk Drive). A system program is stored in the storing unit 220. The storing unit 220 is used for storage of various data and processing of the data.

The control unit 210 gives, on the basis of the system program stored in the storing unit 220, commands for controlling the operations of the measuring unit 130, the reciprocating mechanism 140, and the driving unit 150 of the measurement head 100 to the control board 160. The control unit 210 acquires image data from the control board 160 and causes the storing unit 220 to store the image data. Further, the control unit 210 performs, for example, measurement of a portion designated by a user on an image based on the image data.

During the measurement, the control unit 210 can correct the image data such that a tilt of the portion designated by the user on the image based on the image data is a desired tilt (e.g., horizontal). Consequently, even when the housing unit 120 is attached to the supporting structure 110 or an attachment instrument explained below in an inclined state, it is possible to obtain an accurate measurement result of a desired portion of the measuring object S.

The operation unit 230 includes a pointing device such as a mouse, a touch panel, a trackball, or a joystick and a keyboard. The operation unit 230 is operated by the user in order to give an instruction to the control unit 210. The display unit 240 includes, for example, an LCD (Liquid Crystal Display) panel or an organic EL (Electro Luminescence) panel. The display unit 240 displays an image based on image data stored in the storing unit 220, a measurement result, and the like.

(2) Configuration of the Measuring Unit

Figure 2:
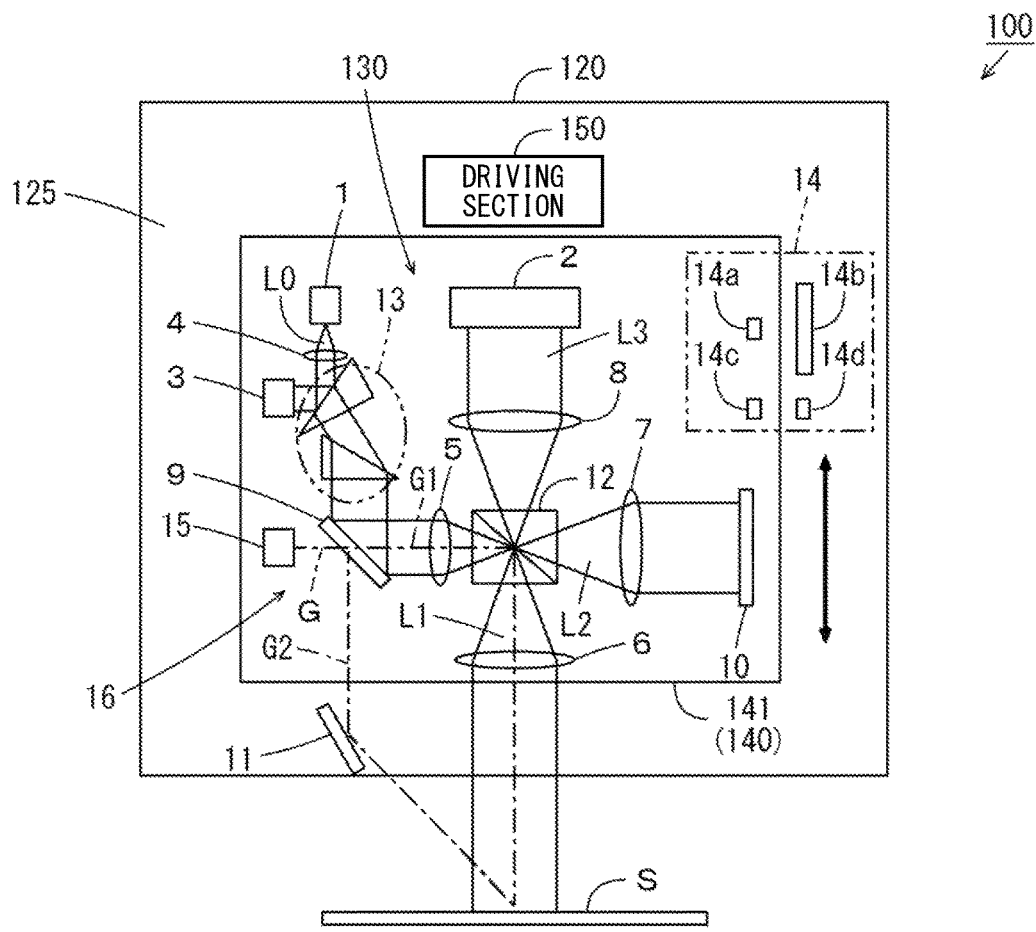
FIG. 2 is a schematic diagram of a measurement head mainly showing the configuration of a measuring unit.

FIG. 2 is a schematic diagram of the measurement head 100 mainly showing the configuration of the measuring unit 130. As shown in FIG. 2, the supporting section 125 is housed in the housing unit 120. The supporting section 125 may be formed integrally with the housing unit 120 or may be a part of the housing unit 120. The reciprocating mechanism 140 includes a movable section 141 capable of vibrating in parallel to one direction with respect to the supporting section 125. In FIG. 2, a vibrating direction of the movable section 141 is indicated by a thick arrow. In an example shown in FIG. 2, the vibrating direction of the movable section 141 is the up-down direction.

The measuring unit 130 includes a light projecting section 1, light receiving sections 2 and 3, a plurality of lenses 4 to 8, a plurality of mirrors 9 to 11, a beam splitter 12, an anamorphic prism pair 13, a position detecting section 14, and a guide light source 15. Parts of the mirror 11 and the position detecting section 14 of the measuring unit 130 are attached to the supporting section 125. On the other hand, the measuring unit 130 excluding the parts of the mirror 11 and the position detecting section 14 are attached to the movable section 141.

The light projecting section 1 includes, for example, an SLD (Super Luminescent Diode) and emits light. The light emitted by the light projecting section 1 is referred to as emitted light L0. Coherency of the emitted light L0 is relatively low. Specifically, the coherency of the emitted light L0 is higher than the coherency of light or white light emitted by a LED (Light Emitting Diode) and lower than the coherency of laser light. Therefore, the emitted light L0 has a plurality of peak wavelengths. The lens 4 is a collimator lens. The emitted light L0 is transmitted through the lens 4 to be collimated and is transmitted through the anamorphic prism pair 13 to be shaped to be circular in section.

Note that a part of the emitted light L0 is reflected without being transmitted through the anamorphic prism pair 13. The emitted light L0 reflected by the anamorphic prism pair 13 is received by the light receiving section 3. A light receiving signal indicating a light receiving amount is output to the control board 160 (FIG. 1). A light amount of the emitted light L0 is measured by the control board 160 on the basis of the light receiving signal output by the light receiving section 3. When the measured light amount of the emitted light L0 indicates an abnormal value, the operation of the light projecting section 1 is stopped by the control board 160. In this way, it is possible to manage the light amount of the emitted light using the emitted light not used for the measurement.

The reflectance of the mirror 9 has wavelength selectivity. Specifically, the mirror 9 has high reflectance (desirably 100%) in a wavelength region of the emitted light L0 and has reflectance lower than 100% in a wavelength region of guide light G explained below. The emitted light L0 transmitted through the anamorphic prism pair 13 is reflected by the mirror 9 and thereafter made incident on the beam splitter 12 while being condensed by being transmitted through the lens 5.

A part of the emitted light L0 is reflected by the beam splitter 12. The remaining part of the emitted light L0 is transmitted through the beam splitter 12. The emitted light L0 reflected by the beam splitter 12 and the emitted light L0 transmitted through the beam splitter 12 are respectively referred to as measurement light L1 and reference light L2.

A lens 6 is an objective lens. The measurement light L1 is collimated by being transmitted through the lens 6. A spot diameter of the measurement light L1 at this point is relatively large and is, for example, 4 mm or 10 mm. Thereafter, the measurement light L1 travels in substantially the same direction as a vibrating direction of the movable section 141 and is irradiated on a relatively large circular region of the measuring object S. A part of the measurement light L1 reflected by the measuring object S is made incident on the beam splitter 12 while being condensed by being transmitted through the lens 6.

The mirror 10 is a so-called reference mirror. The reference light L2 is collimated and irradiated on the mirror 10 be being transmitted through a lens 7. The reference light L2 reflected by the mirror 10 is made incident on the beam splitter 12 while being condensed by being transmitted through the lens 7. The measurement light L1 and the reference light L2 made incident on the beam splitter 12 interfere with each other and are guided to the light receiving section 2 as interference light L3. The operation of the light receiving section 2 is explained below.

The position detecting section 14 includes reading sections 14a and 14b, a scale 14c, and a magnet 14d. The reading sections 14a and 14b are attached to the movable section 141. The scale 14c and the magnet 14d are attached to the supporting section 125. The scale 14c has a plurality of gradations and is formed by glass extending in one direction. The reading section 14a is disposed to be opposed to a part of the scale 14c. The reading section 14a includes a light projecting element and a light receiving element. The reading section 14a optically reads a gradation of a portion of the scale 14c opposed to the reading section 14a to thereby detect relative positions of the movable section 141 with respect to the supporting section 125.

The reading section 14b is a Hall element and is disposed to detect magnetism by the magnet 14d. In this embodiment, a portion of the scale 14c read by the reading section 14a when the reading section 14b detects maximum magnetism is set as an origin. The origin of the scale 14c may be updated as appropriate during a start of the measurement head 100 or other points in time. According to detection results of the reading sections 14a and 14b, it is possible to specify an absolute position of the movable section 141.

In this embodiment, the reading sections 14a and 14b are attached to the movable section 141. The scale 14c and the magnet 14d are attached to the supporting section 125. However, the present invention is not limited to this. The reading sections 14a and 14b may be attached to the supporting section 125. The scale 14c and the magnet 14d may be attached to the movable section 141.

In this embodiment, the reading section 14a optically detects the position of the movable section 141. However, the present invention is not limited to this. The reading section 14a may detect the position of the movable section 141 according to, for example, other mechanical, electric, or magnetic systems. Further, when the reading section 14a is capable of detecting the absolute position of the movable section 141 or when it is unnecessary to detect the absolute position of the movable section 141, the position detecting section 14 does not have to include the reading section 14b and the magnet 14d.

The guide light source 15 is a laser light source that emits laser light having a wavelength in a visible region (in this example, a red region). The laser light emitted by the guide light source 15 is referred to as guide light G. In FIG. 2, the guide light G is indicated by an alternate long and short dash line. As explained above, the reflectance of the mirror 9 is lower than 100% in the wavelength region of the guide light G. Therefore, a part of the guide light G is transmitted through the mirror 9. The remaining part of the guide light G is reflected by the mirror 9. The guide light G transmitted through the mirror 9 and the guide light G reflected by the mirror 9 are respectively referred to as first and second guide lights G1 and G2.

The first guide light G1 is condensed by being transmitted through the lens 5 and is superimposed on the measurement light L1 by being reflected by the beam splitter 12. Consequently, the first guide light G1 travels in substantially the same direction as the vibrating direction of the movable section 141, collimated by being transmitted through the lens 6, and thereafter irradiated on the measuring object S.

The second guide light G2 is reflected by the mirror 11 attached to the supporting section 125 to thereby travel in a direction crossing the first guide light G1. The mirror 11 is disposed such that, when the movable section 141 is present in a predetermined position in the vibrating direction (e.g., near the origin of the scale 14c), the first guide light G1 and the second guide light G2 cross in the position of the focal point of the light receiving section 2.

In this way, a guide section 16 is configured by the mirror 9, the mirror 11, the beam splitter 12, and the guide light source 15. With this configuration, the user can easily locate the surface of the measuring object S on the focal point of the light receiving section 2 by disposing the surface of the measuring object S in the position where the first guide light G1 and the second guide light G2 cross.

In this embodiment, the emission of the guide light G by the guide light source 15 is performed in a non-measurement period T2 shown in FIG. 3 explained below and is not performed in a measurement period T1 shown in FIG. 3. For that reason, the measurement of the measuring object S is prevented from being affected by the guide light G. On the other hand, when the guide light G does not affect the measurement of the measuring object S, for example, when the light receiving section 2 is configured not to detect light in the wavelength band of the guide light G, the guide light source 15 may be controlled to emit the guide light G in the measurement period T1 as well.

In this embodiment, the guide section 16 is disposed such that the first and second guide lights G1 and G2 cross at the focal point of the light receiving section 2. However, the present invention is not limited to this. The guide section 16 may be disposed such that, when the surface of the measuring object S is present in the position of the focal point of the light receiving section 2, a pattern of the first guide light G1 and a pattern of the second guide light G2 projected on the surface of the measuring object S have a specific positional relation.

(3) Operation of the Measuring Unit

The movable section 141 is cyclically vibrated by the driving unit 150 in parallel to one direction with respect to the supporting section 125 in synchronization with a sampling signal. The sampling signal may be generated on the inside of the processing device 200 (FIG. 1) or may be given to the movable section 141 from the outside of the processing device 200. FIG. 3 is a diagram showing the vibration of the movable section 141. In FIG. 3, the horizontal axis indicates time and the vertical axis indicates the position of the movable section 141.

Figure 3:
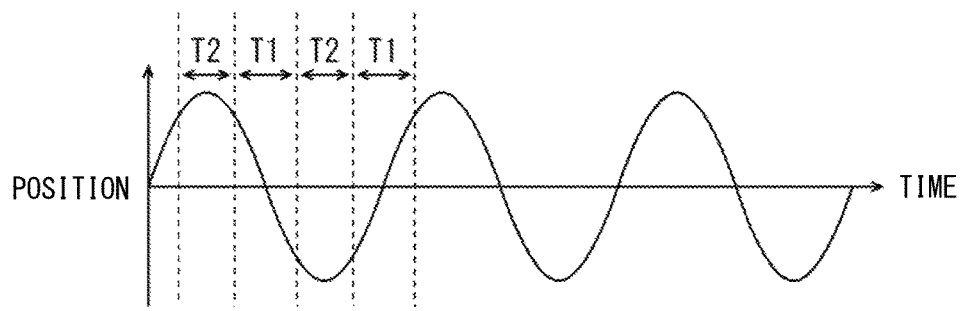
FIG. 3 is a diagram showing vibration of a movable section.

As shown in FIG. 3, in this embodiment, the position of the movable section 141 changes in a sine curve shape. In a period in which the position of the movable section 141 changes, the measurement of the measuring object S is performed in a part of the period and is not performed in the other period. The period in which the measurement of the measuring object S is performed is referred to as measurement period T1. The period in which the measurement is not performed is referred to as non-measurement period T2. In this embodiment, a period corresponding to a substantially linearly changing portion in the sine curve shown in FIG. 3 is allocated as the measurement period T1. A period corresponding to the vicinity of an inflection portion of the sine curve is allocated as the non-measurement period T2.

The control board 160 (FIG. 1) controls light reception timing of the light receiving section 2 on the basis of the sampling signal. The light receiving section 2 includes a two-dimensional area sensor in which a plurality of pixels are arrayed in the vertical direction and the horizontal direction. In this embodiment, the number of pixels in the vertical direction and the number of pixels in the horizontal direction of the area sensor are three hundred. A total number of pixels is ninety thousand. Consequently, it is possible to receive the interference light L3 having a relatively large spot diameter. The light receiving section 2 detects, on the basis of the control by the control board 160, a light receiving amount in each of positions of the movable section 141 concerning the pixels in the measurement period T1. On the other hand, the light receiving section 2 does not detect a light receiving amount in the non-measurement period T2.

Figure 4A:
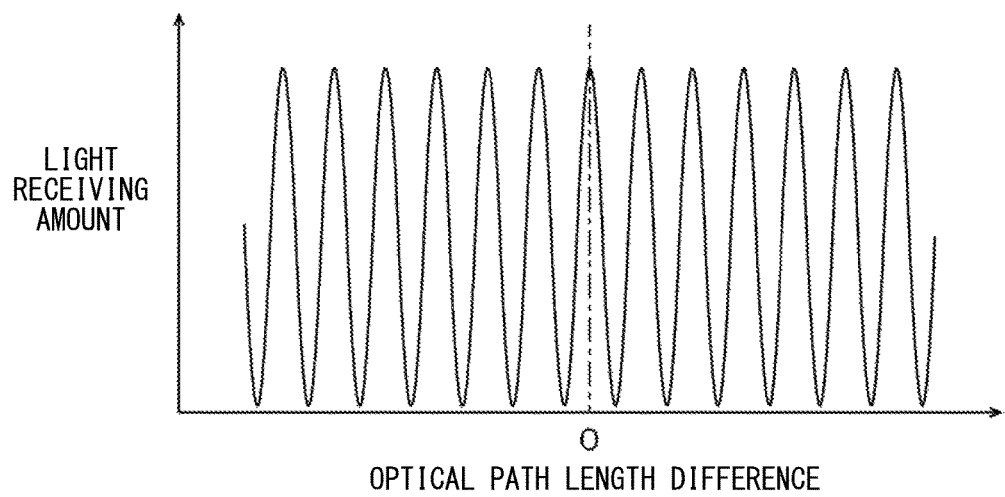
FIGS. 4A and 4B are diagrams showing a light receiving amount distribution that should be acquired by a light receiving section concerning any pixel.
Figure 4B:
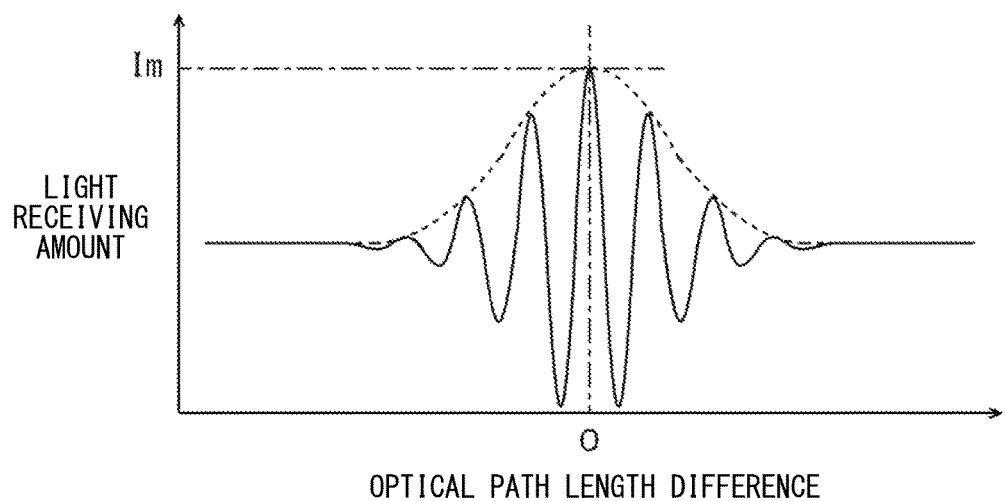

FIGS. 4A and 4B are diagrams showing a light receiving amount distribution that should be acquired by the light receiving section 2 concerning any pixel. In FIGS. 4A and 4B, the horizontal axis indicates a difference between an optical path length of the measurement light L1 and an optical path length of the reference light L2 and the vertical axis indicates a detected light receiving amount. The difference between the optical path length of the measurement light L1 and the optical path length of the reference light L2 is hereinafter referred to as optical path length difference. When the position of the movable section 141 changes, the optical path length of the reference light L2 does not change but the optical path length of the measurement light L1 changes. Therefore, the optical path length difference changes.

If the coherency of the emitted light L0 is high and the emitted light L0 has a single peak wavelength λ, the measurement light L1 and the reference light L2 intensify each other when the optical path length difference is n×λ and weaken each other when the optical path length difference is (n+½)×λ. In the above description, n is any integer. For that reason, as shown in FIG. 4A, the light receiving amount fluctuates between a maximum and a minimum every time the optical path length difference changes by a half of the peak wavelength.

On the other hand, if the emitted light L0 has a plurality of peak wavelengths, the optical path length differences at the time when the measurement light L1 and the reference light L2 intensity each other and at the time when the measurement light L1 and the reference light L2 weaken each other are different at each of the peak wavelengths. For that reason, a light receiving amount distribution obtained by adding up the same light receiving amount distributions as the light receiving amount distribution shown in FIG. 4A different at each of the peak wavelengths is acquired. Specifically, as indicated by a solid line in FIG. 4B, a plurality of peaks appear in the light receiving amount distribution in a small range of the optical path length difference. A peak light receiving amount at the time when the optical path length is 0 is the largest. The peak light receiving amount decreases as the optical path length difference is larger. A range of the optical path length difference in which the peaks appear is wider as the coherency of the emitted light L0 is higher.

In this embodiment, as indicated by a dotted light in FIG. 4B, the light receiving section 2 specifies an envelope of the light receiving amount distribution and gives data indicating the specified envelope to the control board 160 as measurement data. The control board 160 specifies a point in time when the optical path length difference is 0 and a maximum light receiving amount Im on the basis of the envelope indicated by the acquired measurement data. The coherency of the emitted light L0 is higher than the coherency of light emitted by an LED. Therefore, peaks appear in a range of the optical path length difference wider than when the LED is used. Therefore, even if a frequency of the detection of a light receiving amount is reduced, it is possible to accurately specify the point in time when the optical path length difference is 0 and the maximum light receiving amount Im. Consequently, it is possible to increase the measurement in speed.

The control board 160 specifies the position of the movable section 141 at the specified point in time on the basis of a detection result of the position detecting section 14 (FIG. 2). Further, the control board 160 generates pixel data on the basis of the specified position of the movable section 141 and the acquired maximum light receiving amount Im. The pixel data generated on the basis of the position of the movable section 141 is referred to as height data. The pixel data generated on the basis of the maximum light receiving amount Im is referred to as luminance data.

The control board 160 generates image data on the basis of a plurality of pixel data. The image data generated on the basis of the height data is referred to as height image data. The image data generated on the basis of the luminance data is referred to as luminance image data. The height image data indicates shapes (heights) of parts of the surface of the measuring object S. The luminance image data represents luminances of the parts of the surface of the measuring object S. The control board 160 generates, on the basis of the absolute position of the movable section 141 detected by the position detecting section 14, distance data indicating the distance from the measurement head 100 to the measuring object S. The control board 160 gives the generated height image data, luminance image data, and distance data to the processing device 200 (FIG. 1).

(4) Vibration Damping Structure of the Reciprocating Mechanism

Figure 5:
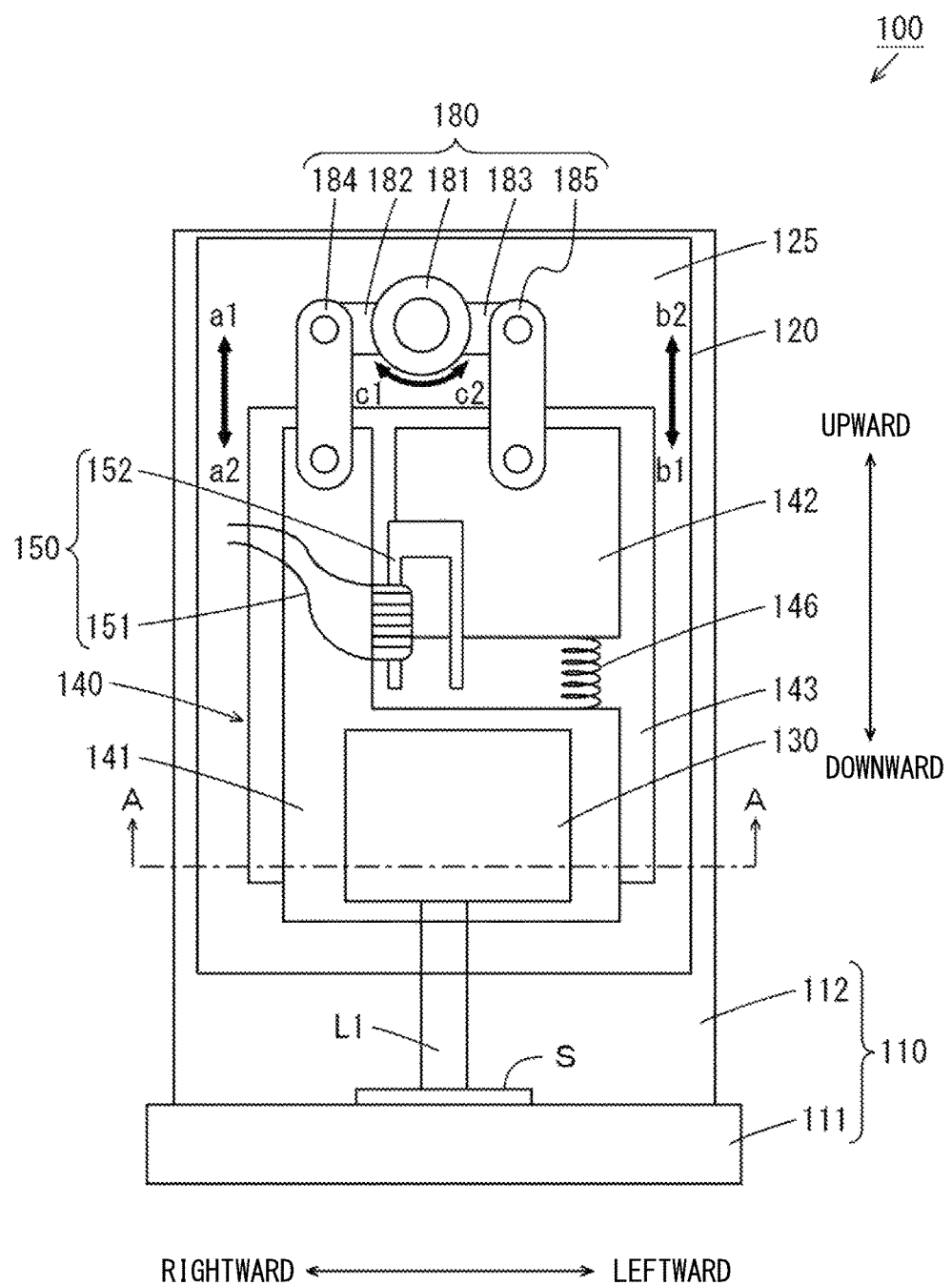
FIG. 5 is a schematic front view of the measurement head mainly showing the configuration of a reciprocating mechanism.

In the following explanation, a direction from one end portion to the other end portion of the setting section 111, in which the holding section 112 shown in FIG. 1 is provided, is represented as the forward direction of the measurement head 100 and the opposite direction of the direction is represented as a rearward direction of the measurement head 100. A direction orthogonal to the front-rear direction and the up-down direction is represented as a left-right direction. FIG. 5 is a schematic front view of the measurement head 100 mainly showing the configuration of the reciprocating mechanism 140. As shown in FIG. 5, the measurement head 100 further includes a rotation supporting unit 180. The rotation supporting unit 180 includes a rotating shaft 181, fixed arms 182 and 183, and swinging arms 184 and 185.

The rotating shaft 181 has a substantially columnar shape and is provided to project forward from the supporting section 125 in a state in which the rotating shaft 181 is capable of rotating around an axis perpendicular to the supporting section 125. The fixed arms 182 and 183 are provided to respectively project in one direction and the other direction from the side surface of the rotating shaft 181. The swinging arms 184 and 185 are swingably attached to the distal ends of the fixed arms 182 and 183 to extend downward.

The reciprocating mechanism 140 further includes a balancing section 142 and an elastic member 146 in addition to the movable section 141. The measuring unit 130 excluding parts of the mirror 11 and the position detecting section 14 shown in FIG. 2 is attached to the movable section 141. The balancing section 142 is, for example, a counterweight and has weight substantially equal to the weight of the movable section 141. The movable section 141 and the balancing section 142 are respectively attached to the lower ends of the swinging arms 184 and 185.

The driving unit 150 includes a coil section 151 and a yoke section 152. The coil section 151 is fixed to the movable section 141 in a state in which the coil section 151 is wound around the yoke section 152. On the other hand, the yoke section 152 is fixed to the balancing section 142. When an electric current is fed to the coil section 151, a driving force for vibrating the yoke section 152 in the up-down direction is generated. As reaction of the driving force, a driving force for vibrating the coil section 151 in the opposite direction of the driving force for vibrating the yoke section 152 is generated.

In this way, the driving unit 150 is not attached to the housing unit 120 and is attached between the movable section 141 and the balancing section 142 mechanically insulated from the housing unit 120. In this case, a driving force for vibrating the reciprocating mechanism 140 is not transmitted to the housing unit 120 and the supporting structure 110. For that reason, vibration does not occur in the supporting structure 110. Therefore, it is unnecessary to increase the supporting structure 110 in size and weight in order to increase the rigidity of the supporting structure 110. Consequently, it is possible to reduce the measurement head 100 in size and weight.

Note that, in this embodiment, the coil section 151 is attached to the movable section 141 and the yoke section 152 is attached to the balancing section 142. However, the present invention is not limited to this. The coil section 151 may be attached to the balancing section 142 and the yoke section 152 may be attached to the movable section 141.

When the movable section 141 vibrates upward as indicated by an arrow a1, the balancing section 142 vibrates downward as indicated by an arrow b1. The driving force of the driving unit 150 is transmitted to the rotating shaft 181 via the fixed arms 182 and 183 and the swinging arms 184 and 185, whereby the rotating shaft 181 rotates clockwise as indicated by an arrow c1.

Similarly, when the movable section 141 vibrates downward as indicated by an arrow a2, the balancing section 142 vibrates upward as indicated by an arrow b2. The driving force of the driving unit 150 is transmitted to the rotating shaft 181 via the fixed arms 182 and 183 and the swinging arms 184 and 185, whereby the rotating shaft 181 rotates counterclockwise as indicated by an arrow c2.

This motion is alternately repeated, whereby the movable section 141 and the balancing section 142 vibrate in the up-down direction. Vibrating directions of the movable section 141 and the balancing section 142 are opposite directions each other. Displacements of the vibrations of the movable section 141 and the balancing section 142 are equal to each other. Vibrations in directions other than the up-down direction of the movable section 141 and the balancing section 142 is restricted by sliding sections 144 shown in FIG. 6 explained below. For that reason, it is possible to stably vibrate the movable section 141 and the balancing section 142. Details are explained below.

With this configuration, even when the movable section 141 is vibrated, the center-of-gravity position of the measurement head 100 hardly changes. For that reason, even when the movable section 141 is vibrated at high speed and even when the movable section 141 is greatly vibrated, vibration does not occur in the measurement head 100. Consequently, it is possible to greatly vibrate the movable section 141 at high speed. Consequently, it is possible to measure the measuring object S at high speed. It is possible to increase a measurement range in the height direction of the measuring object S.

Note that, in this embodiment, it is possible to selectively operate the measurement head 100 in a low-speed mode for vibrating the movable section 141 at low speed and a high-speed mode for vibrating the movable section 141 at high speed. A measurement range in the low-speed mode is, for example, ±0.7 mm. A measurement range in the high-speed mode is, for example, ±0.35 mm. For that reason, the user can measure the measuring object S large in the height direction by selecting the low-speed mode. On the other hand, the user can measure the measuring object S small in the height direction at high speed by selecting the high-speed mode.

In this embodiment, the movable section 141 and the balancing section 142 are coupled by the elastic member 146. The elastic member 146 is, for example, a spring member having a spring constant k. That is, in the reciprocating mechanism 140, the movable section 141 having mass m and the balancing section 142 having mass m are respectively attached to both ends of the elastic member 146 having the spring constant k. The movable section 141 and the balancing section 142 respectively perform simple harmonic oscillation such that the center of the elastic member 146 is a fixed point.

The mass m of the movable section 141 and the mass m of the balancing section 142 are equal. For that reason, a natural frequency of a vibration system configured by a portion of the movable section 141 to the fixed point of the elastic member 146 and a natural frequency of a vibration system configured by a portion of the balancing section 142 to the fixed point of the elastic member 146 coincide with each other. In this case, since the entire reciprocating mechanism 140 has a single natural frequency, it is possible to easily cause the reciprocating mechanism 140 to perform the simple harmonic oscillation. Consequently, it is possible to reduce energy given to the driving unit 150 (an electric current fed to the coil section 151) in order to vibrate the reciprocating mechanism 140.

The spring constant of the elastic member 146 is desirably set such that the natural frequency of the reciprocating mechanism 140 is within a fixed range from a vibration frequency of the reciprocating mechanism 140. In this embodiment, for example, when the natural frequency of the reciprocating mechanism 140 is set to 1, the spring constant is set such that the vibration frequency of the reciprocating mechanism 140 in the low-speed mode is, for example, 2/3 and the vibration frequency of the reciprocating mechanism 140 in the high-speed mode is, for example, 4/3.

In this way, the spring constant of the elastic member 146 is set such that the natural frequency of the reciprocating mechanism 140 is larger than the vibration frequency of the reciprocating mechanism 140 in the low-speed mode and smaller than the vibration frequency of the reciprocating mechanism 140 in the high-speed mode. Consequently, it is possible to improve energy efficiency of the reciprocating mechanism 140 in the low-speed mode and energy efficiency of the reciprocating mechanism 140 in the high-speed mode to the same degree.

When the natural frequency of the reciprocating mechanism 140 is matched with the vibration frequency of the reciprocating mechanism 140, the reciprocating mechanism 140 sometimes shows unstable behavior depending on an attenuation characteristic of the reciprocating mechanism 140. In this embodiment, the natural frequency of the reciprocating mechanism 140 is set to a value slightly different from the vibration frequency of the reciprocating mechanism 140. Consequently, it is possible to improve the energy efficiency of the reciprocating mechanism 140 and stabilize the behavior of the reciprocating mechanism 140.

With the configuration explained above, it is possible to minimize the energy given to the driving unit 150 in order to vibrate the reciprocating mechanism 140. Since the energy for vibrating the movable section 141 is extremely small in this way, in this embodiment, during the operation of the measurement head 100, the reciprocating mechanism 140 is always vibrated irrespective of the measurement period T1 and the non-measurement period T2 shown in FIG. 3.

Further, in this embodiment, since the swinging arms 184 and 185 are capable of swinging, the direction of the swinging arms 184 and 185 does not change even if the swinging arms 184 and 185 vibrate in the up-down direction. Therefore, even if the movable section 141 vibrates in the up-down direction, the direction of the measuring unit 130 attached to the movable section 141 is maintained constant. Consequently, it is possible to prevent the direction of the measurement light L1 irradiated on the measuring object S from the measuring unit 130 from changing.

In this embodiment, the balancing section 142 is a counterweight. However, the present invention is not limited to this. The balancing section 142 may be a movable section having the same configuration as the configuration of the movable section 141. A measuring unit same as the measuring unit 130 may be attached to the movable section. In this case, it is possible to simultaneously measure two regions without increasing the weight of the measurement head 100.

(5) Life Extending Structure of the Reciprocating Mechanism

Figure 6:
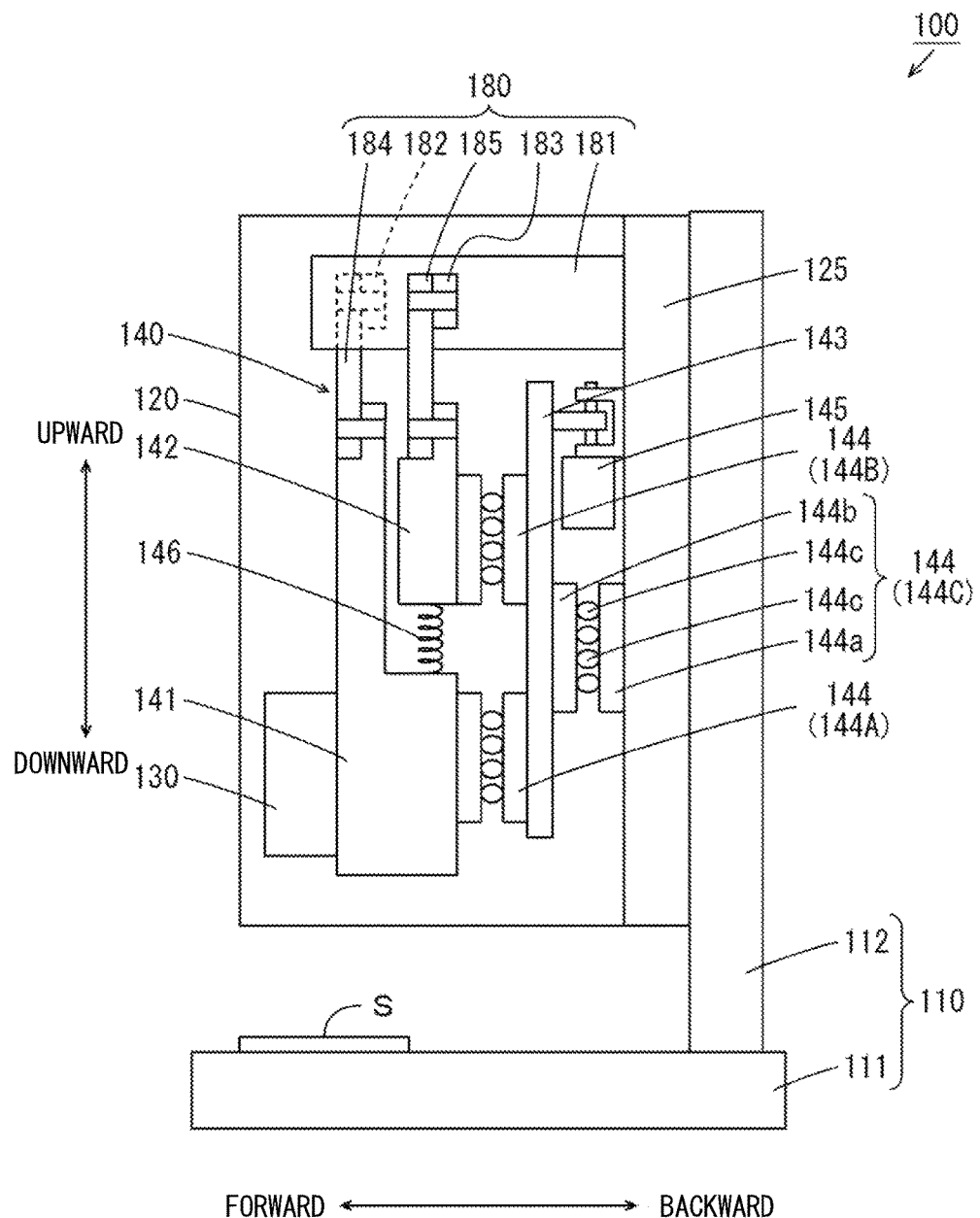
FIG. 6 is a schematic left side view of the measurement head mainly showing the configuration of the reciprocating mechanism.
Figure 7:
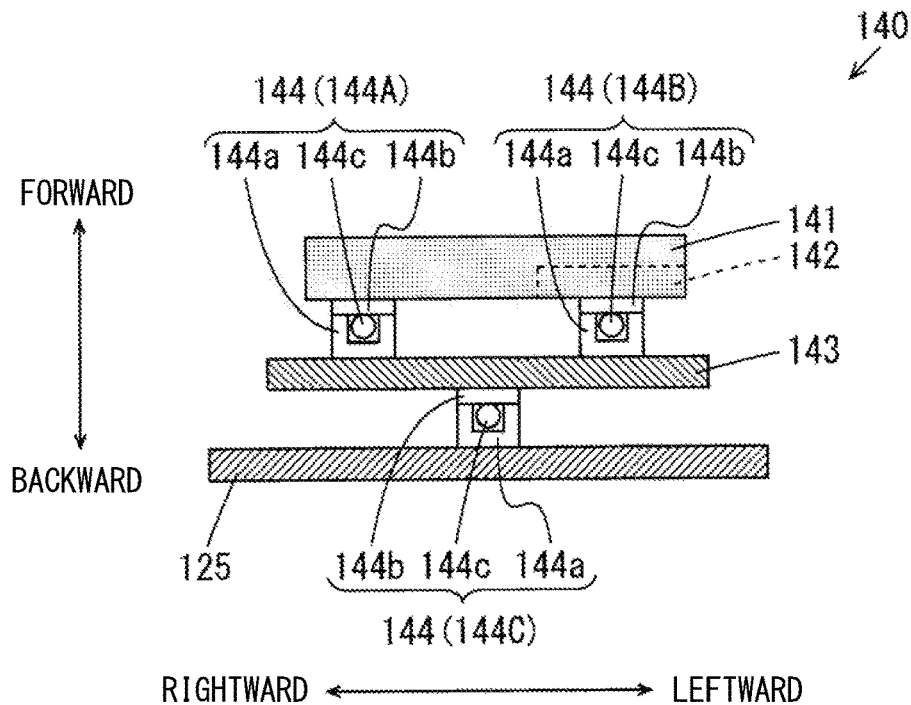
FIG. 7 is an A-A line sectional view of the measurement head shown in FIG. 5.

FIG. 6 is schematic side view of the measurement head 100 mainly showing the configuration of the reciprocating mechanism 140. FIG. 7 is an A-A line sectional view of the measurement head 100 shown in FIG. 5. As shown in FIG. 6, the reciprocating mechanism 140 further includes a plate section 143, three sliding sections 144, and a driving unit 145 in addition to the movable section 141, the balancing section 142, and the elastic member 146. The sliding sections 144 are linear motion bearings. Each of the sliding sections 144 includes a fixed rail 144a, a movable table 144b, and a plurality of rolling members 144c.

The plurality of rolling members 144c are disposed at substantially equal intervals between the fixed rail 144a and the movable table 144b and retained by a not-shown retaining tool (a retainer). Lubricant such as viscous grease is applied to the plurality of rolling members 144c. The plurality of rolling members 144c rotate around rotation axes, whereby the movable table 144b smoothly slides in parallel to one direction with respect to the fixed rail 144a. In the following direction, when the three sliding sections 144 are distinguished, the three sliding sections 144 are respectively referred to as sliding sections 144A, 144B, and 144C.

The plate section 143 is attached to the supporting section 125 of the housing unit 120 via the sliding section 144C to be capable of sliding in the up-down direction. In an example shown in FIGS. 6 and 7, the fixed rail 144a of the sliding section 144C is attached to the supporting section 125. The movable table 144b of the sliding section 144C is attached to one surface of the plate section 143.

The movable section 141 and the balancing section 142 are attached to the other surface of the plate section 143 respectively via the sliding sections 144A and 144B to be capable of sliding in the up-down direction. In the example shown in FIGS. 6 and 7, the fixed rail 144a of the sliding section 144A is attached to the other surface of the plate section 143. The movable table 144b of the sliding section 144A is attached to the movable section 141. The fixed rail 144a of the sliding section 1443 is attached to the other surface of the plate section 143. The movable table 144b of the sliding section 144B is attached to the balancing section 142. Consequently, vibration in directions other than the up-down direction of the movable section 141 and the balancing section 142 is restricted.

In this example, the fixed rail 144a and the movable table 144b of the sliding section 144C are respectively attached to supporting section 125 and the plate section 143. However, the present invention is not limited to this. The fixed rail 144a and the movable table 144b of the sliding section 144C may be respectively attached to the plate section 143 and the supporting section 125. That is, a positional relation between the fixed rail 144a and the movable table 144b of the sliding section 144C may be opposite. The same applies to the sliding sections 144A and 144B.

As explained above, the lubricant is applied to the plurality of rolling members 144c of each of the sliding section 144. However, a movable range (e.g., ±0.7 mm) of the movable section 141 and the balancing section 142 is smaller than the circumference length (e.g., several millimeters) around the rotation axes of the rolling members 144c. For that reason, only parts of regions around the rotation axes of the rolling members 144c are in contact with the fixed rail 144a or the movable table 144b. The other regions around the rotation axes of the rolling members 144c are not in contact with the fixed rail 144a and the movable table 144b. In this case, circulation of the lubricant does not occur around the rolling members 144c. The lubricant dries up in parts of the regions of the rolling members 144c.

Therefore, in this embodiment, the driving unit 145 is attached to the supporting section 125 of the housing unit 120 to be capable of vibrating the plate section 143. Note that a cycle of the vibration of the plate section 143 is larger than a cycle of the vibration of the reciprocating mechanism 140. The driving unit 145 is an actuator. The driving unit 145 vibrates the plate section 143 in a range larger than the circumference length around the rotation axes of the rolling members 144c. Therefore, the plurality of rolling members 144c of each of the sliding sections 144 rotates one round or more around the rotation axis.

With this configuration, the entire regions around the rotation axes of the rolling members 144c are in contact with the fixed rail 144a or the movable table 144b. Therefore, the lubricant is circulated around the rolling members 144c. Consequently, friction between the rolling members 144c and the fixed rail 144a or the movable table 144b is reduced and seizure is prevented. As a result, as in this embodiment, even when the reciprocating mechanism 140 is always vibrated during the operation of the measurement head 100, it is possible to extend the life of the reciprocating mechanism 140.

In this embodiment, the driving unit 145 is controlled to perform driving in the non-measurement period T2 shown in FIG. 3 and not to perform driving in the measurement period T1 shown in FIG. 3. For that reason, the measurement of the measuring object S is surely prevented from being affected by the vibration of the plate section 143. On the other hand, even if the plate section 143 vibrates, the vibration is absorbed by the sliding sections 144A and 144B. Therefore, the vibration is hardly transmitted to the movable section 141 and the balancing section 142 and hardly affects the measurement of the measuring object S. Therefore, the driving unit 145 may be controlled to perform driving in the measurement period T1 as well.

Figure 8:
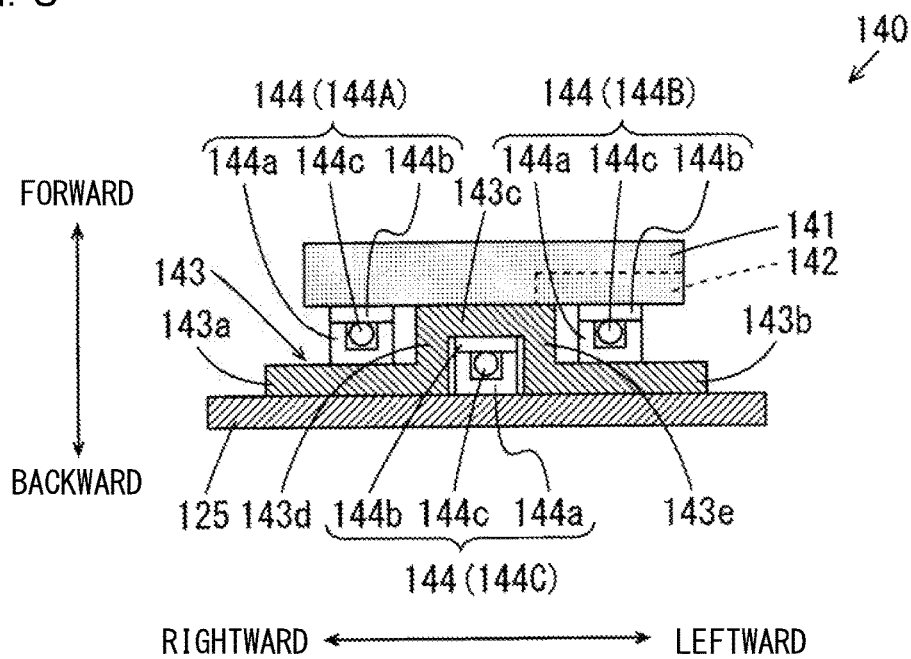
FIG. 8 is a sectional view showing the configuration of a plate section in a modification.

In this embodiment, the plate section 143 is formed flat as a whole. However, the present invention is not limited to this. FIG. 8 is a sectional view showing the configuration of the plate section 143 in a modification. As shown in FIG. 8, in this embodiment, the plate section 143 includes flat sections 143a, 143b, and 143c and projecting sections 143d and 143e. The flat sections 143a and 143b are disposed to be arranged in the left-right direction. The projecting sections 143d and 143e are respectively provided to project forward from the inner end portions of the flat sections 143a and 143b. The flat section 143c is provided to connect the front end portions of the projecting sections 143d and 143e.

The sliding section 144C is disposed in a region surrounded by the flat section 143c and the projecting sections 143d and 143e and attached to one surface of the flat section 143c. The sliding sections 144A and 144B are respectively disposed in the fronts of the flat sections 143a and 143b and respectively attached to the other surfaces of the flat sections 143a and 143b. With this configuration, since the flat sections 143a and 143b do not project forward, it is possible to reduce a forward projection amount of the sliding sections 144A and 144B. Consequently, it is possible to prevent the reciprocating mechanism 140 from being increased in size in the front-rear direction.

In an example shown in FIG. 8, the projecting sections 143d and 143e project perpendicularly forward from the flat sections 143a and 143b. However, the present invention is not limited to this. The projecting sections 143d and 143e may project forward while inclining or curving from the flat sections 143a and 143b.

That is, an interval between the one surface of the flat section 143c and the supporting section 125 only has to be larger than an interval between the one surface of the flat section 143a and the supporting section 125 and an interval between one surface of the flat section 143b and the supporting section 125. An interval between the other surface of the flat section 143a and the movable section 141 only has to be larger than an interval between the other surface of the flat section 143c and the movable section 141. An interval between the other surface of the flat section 143b and the balancing section 142 only has to be larger than an interval between the other surface of the flat section 143c and the balancing section 142.

In this embodiment, the reciprocating mechanism 140 includes the plate section 143 and the sliding sections 144A to 144C. However, the present invention is not limited to this. When the sliding sections 144A and 144B have sufficiently long life, the reciprocating mechanism 140 does not have to include the plate section 143 and the sliding section 144C. In this case, the fixed rails 144a of the sliding sections 144A and 144B are attached to the supporting section 125. When the movable section 141 and the balancing section 142 are configured to vibrate only in one direction, the reciprocating mechanism 140 does not have to include the sliding sections 144A and 144B.

(6) Thermal Separation Structure of the Housing Unit

Figure 9:
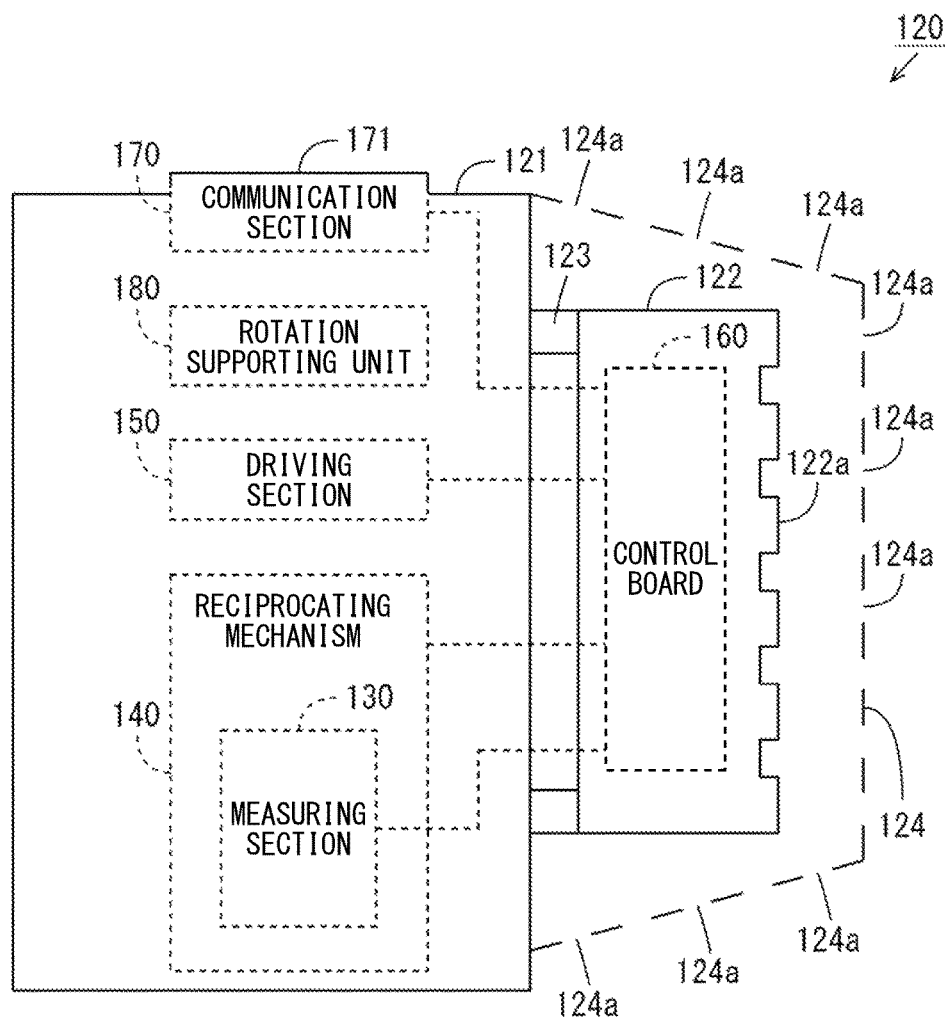
FIG. 9 is a schematic diagram showing an internal configuration of a housing unit.

FIG. 9 is a schematic diagram showing an internal configuration of housing section 120. As shown in FIG. 9, the housing unit 120 includes a measurement housing 121, a control housing 122, a connecting section 123, and a covering section 124. The measurement housing 121 has a large capacity and houses the measuring unit 130, the reciprocating mechanism 140, the driving unit 150, the communication unit 170, and a rotation supporting unit 180. Note that the measurement housing 121 houses the supporting section 125 shown in FIG. 2 as well. The portion of a connection terminal 171 in the communication unit 170 is exposed to the outside from the measurement housing 121.

The control housing 122 houses the control board 160. In this embodiment, a heating value of the control board 160 is large. Therefore, a heat radiation fin 122a (a heat sink) is formed on the outer surface of the control housing 122. Consequently, it is possible to efficiently radiate heat generated from the control board 160 and cool the control board 160 with the air. The connecting section 123 is formed of a material having low thermal conductivity. The connecting section 123 connects the measurement housing 121 and the control housing 122 in a state in which the measurement housing 121 and the control housing 122 are separated from each other. In this example, the connecting section 123 is formed of polycarbonate resin (thermal conductivity: 0.19 W/mK).

With this configuration, heat is hardly transmitted from the control housing 122 to the measurement housing 121. For that reason, accuracy of the measurement of the measuring object S is prevented from being deteriorated. It is possible to easily maintain the temperature around the measuring unit 130 in a range of a specification temperature. Consequently, it is possible to prevent deterioration of the measuring unit 130 and extend the life of the measuring unit 130.

Further, the measuring unit 130 and the control board 160 are provided to be spatially separated from each other and transmission of heat is prevented. Therefore, it is unnecessary to house the measuring unit 130 in the large housing section 120. Therefore, it is possible to reduce the housing unit 120 in size. The temperature of the measuring unit 130 stabilizes in a short time after power-on of the measurement head 100. Therefore, it is possible to reduce a rising time of the measurement head 100.

The covering section 124 is attached to the outer surface of the measurement housing 121 to cover the control housing 122. A plurality of vent holes 124a are formed in the covering section 124. The diameter of the vent holes 124a is set to a value for enabling heat exchange by an air current between the inside and the outside of the covering section 124 and disabling a finger or the like of the body of the user to pass. Consequently, it is possible to prevent the user from touching the heated control housing 122 while cooling the control housing 122 with the air.

The housing unit 120 is supported by the supporting structure 110 (FIG. 1) or an attachment instrument explained below in a state in which the measurement housing 121 is in contact with the holding section 112 (FIG. 2). Since the control housing 122 is not in contact with the supporting structure 110 and the attachment instrument, heat generated from the control housing 122 is not transmitted to the supporting structure 110 and the attachment instrument. Consequently, the temperature of the entire measurement head 100 is prevented from rising. As a result, it is possible prevent deterioration of the measurement head 100 and extend the life of the measurement head 100.

(7) Attachment Structure of the Housing Unit

In this embodiment, the housing unit 120 is attached to the supporting structure 110 such that the measuring unit 130 emits the measurement light L1 (FIG. 2) downward. However, the present invention is not limited to this. The housing unit 120 may be detached from the supporting structure 110 and attached to any attachment instrument in a desired direction. The housing unit 120 includes an attachment structure for attachment to the attachment instrument.

Figure 10:
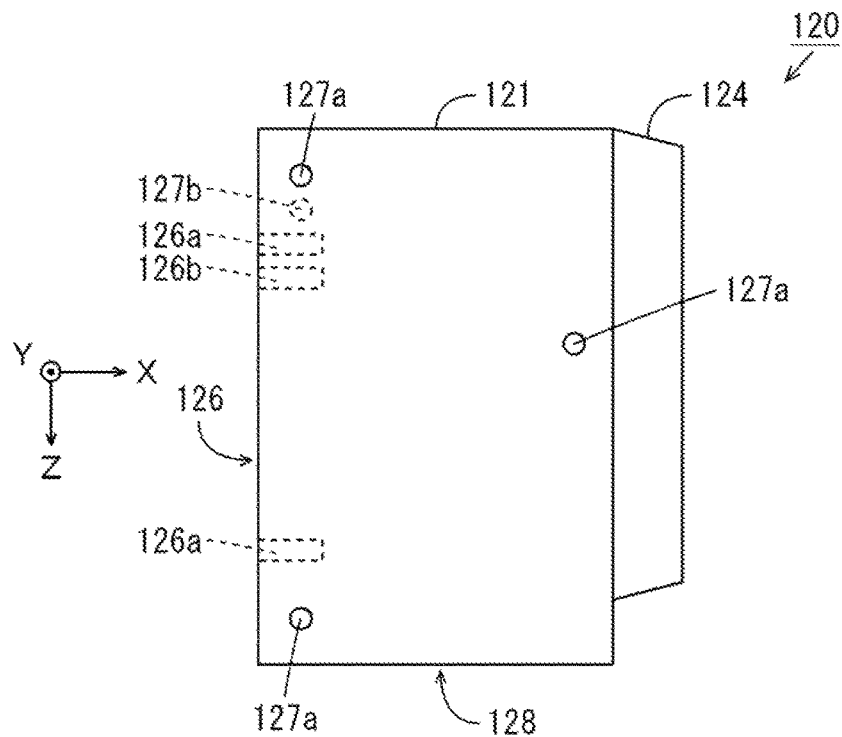
FIG. 10 is a schematic right side view of the housing unit showing an attachment structure.
Figure 11:
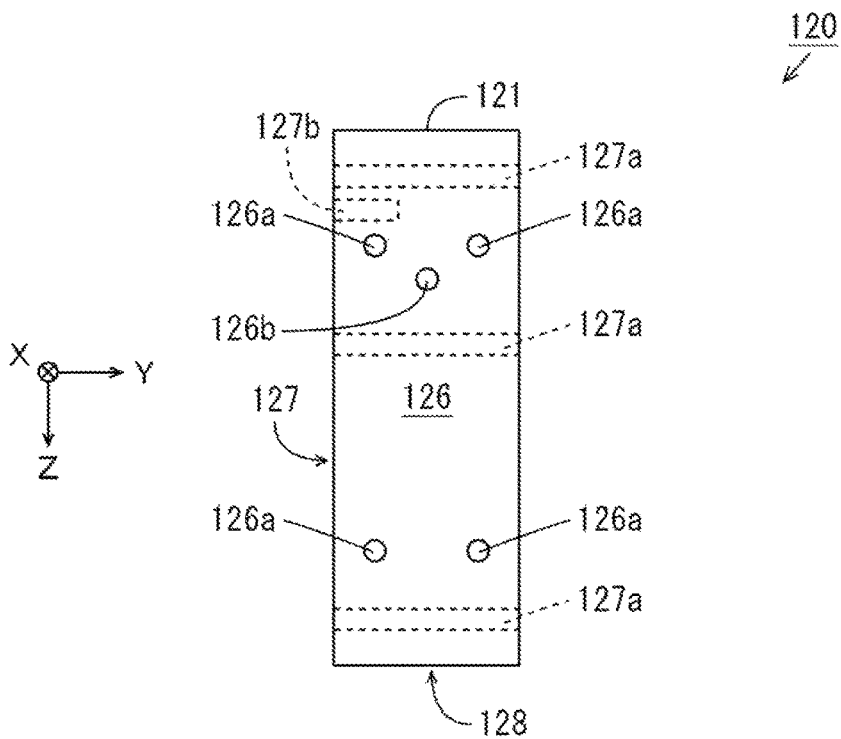
FIG. 11 is a schematic rear view of the housing unit showing the attachment structure.

FIG. 10 is a schematic right side view of the housing unit 120 showing the attachment structure. FIG. 11 is a schematic rear view of the housing unit 120 showing the attachment structure. In FIGS. 10 and 11, an X direction, a Y direction, and a Z direction orthogonal to one another are defined and respectively indicated by arrows X, Y, and Z. The Z direction is a direction in which the measurement light L1 from the housing unit 120 is emitted and corresponds to the up-down direction in FIGS. 5 and 6. The X direction corresponds to the front-rear direction in FIG. 6. The Y direction corresponds to the left-right direction in FIG. 5.

As shown in FIGS. 10 and 11, the housing unit 120 includes an X reference plane 126, a Y reference plane 127, and a Z reference plane 128. The X reference plane 126 is a surface, for example, a back surface of the measurement housing 121 orthogonal to the X direction. The Y reference plane 127 is a surface, for example, a left side surface of the measurement housing 121 orthogonal to the Y direction. The Z reference plane 128 is a surface, for example, a lower surface of the measurement housing 121 orthogonal to the Z direction The X reference plane 126 and the Y reference plane 127 are parallel to the optical path of the measurement light L1. The Z reference plane 128 is perpendicular to the optical path of the measurement light L1.

A plurality of (in this example, four) attachment holes 126a and a locking hole 126b are formed on the X reference plane 126. In this example, the locking hole 126b is a bottomed hole but may be a through hole. Depending on the structure of the attachment instrument, the attachment holes 126a may be bottomed holes or may be through holes. The attachment holes 126a may be screw holes or may be penetration holes, which are not the screw holes. In this example, the attachment holes 126a are bottomed holes and screw holes.

In the Y reference plane 127, a plurality of (in this example, three) attachment holes 127a and a locking hole 127b are formed. In this example, the locking hole 127b is a bottomed hole but may be a through hole. Depending on the structure of the attachment instrument, the attachment holes 127a may be bottomed holes or may be through holes. The attachment holes 127a may be screw holes or may be penetration holes. In this example, the attachment holes 127a are through holes and penetration holes.

Figure 12B:
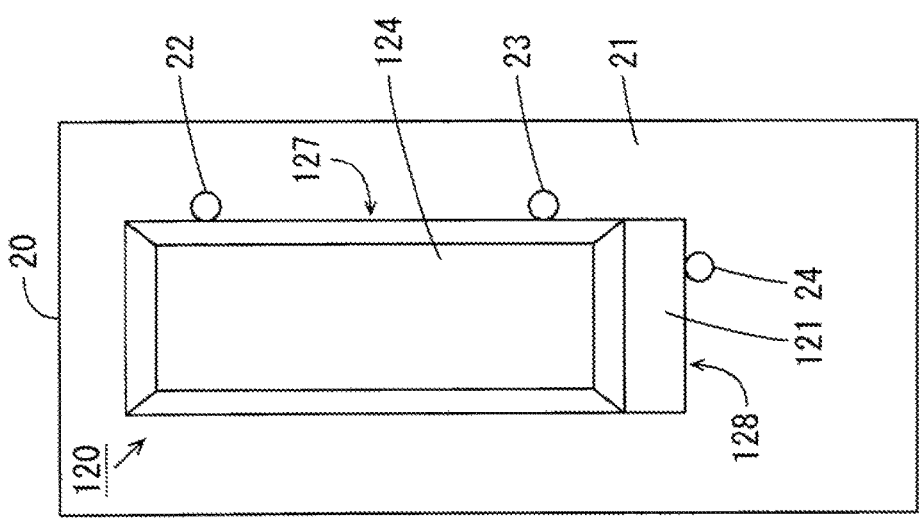
FIGS. 12A and 12B are diagrams for explaining a procedure for attaching an X reference plane of the housing unit to an attachment instrument.
Figure 12A:
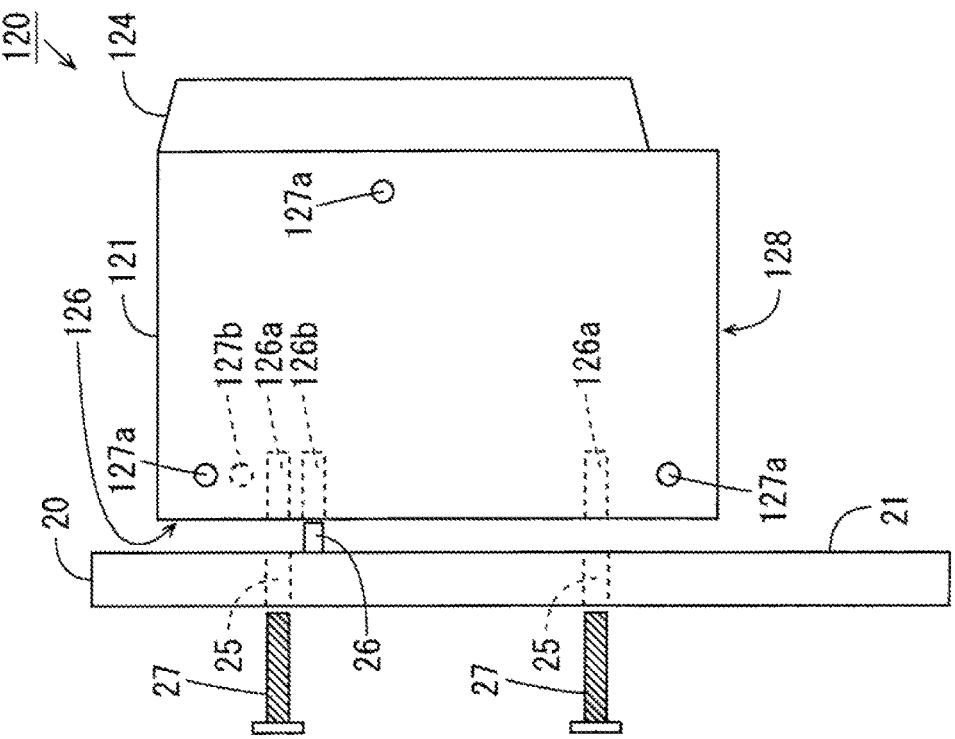

FIGS. 12A and 12B are diagrams for explaining a procedure for attaching the X reference plane 126 of the housing unit 120 to the attachment instrument. As shown in FIG. 12A, an attachment instrument 20 includes an attachment surface 21. The X reference plane 126 shown in FIG. 12A is set in contact with the attachment surface 21 such that the housing unit 120 faces a desired direction. In this state, two pins 22 and 23 are attached to the attachment surface 21 to be in contact with the Y reference plane 127, whereby an emitting direction of the measurement light L1 (hereinafter referred to as measurement direction) is determined. A pin 24 is attached to the attachment surface 21 to be in contact with the Z reference plane 128, whereby the distance from the Z reference plane 128 to the measuring object S (hereinafter referred to as measurement distance) is determined.

After the determination of the measurement direction and the measurement distance, a plurality of penetration holes 25, which respectively correspond to the plurality of attachment holes 126a and pierce through to the rear surface, are formed in the attachment surface 21. A substantially columnar protrusion section 26 corresponding to the locking hole 126b is formed on the attachment surface 21. A projection amount of the protrusion section 26 is slightly smaller than the depth of the locking hole 126b. The diameter of the protrusion section 26 is slightly smaller than the diameter of the locking hole 126b.

A plurality of fixing members 27 respectively corresponding to the plurality of penetration holes 25 are prepared. The fixing members 27 are, for example, screw members. A nominal length of the fixing members 27 is larger than the depth of the penetration holes 25 corresponding to the fixing members 27 and smaller than a total of the depth of the penetration holes 25 and the depth of the attachment holes 126a. In a state in which the protrusion section 26 is inserted into the locking hole 126b, the fixing members 27 are screwed in the attachment holes 126a through the penetration holes 25 corresponding to the fixing members 27. Consequently, the X reference plane 126 of the housing unit 120 is attached to the attachment instrument 20.

Figure 13B:
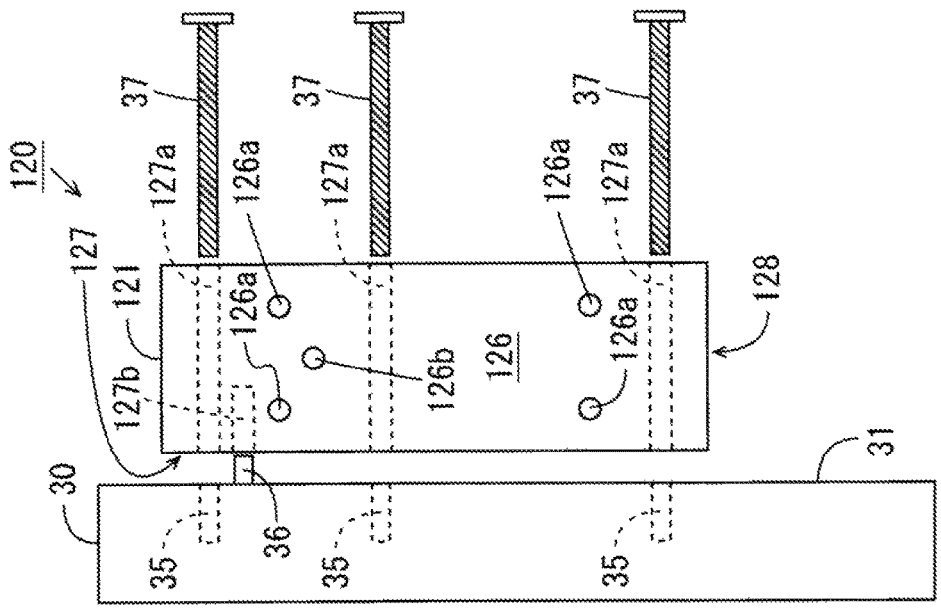
FIGS. 13A and 13B are diagrams for explaining a procedure for attaching a Y reference plane of the housing unit to the attachment instrument.
Figure 13A:
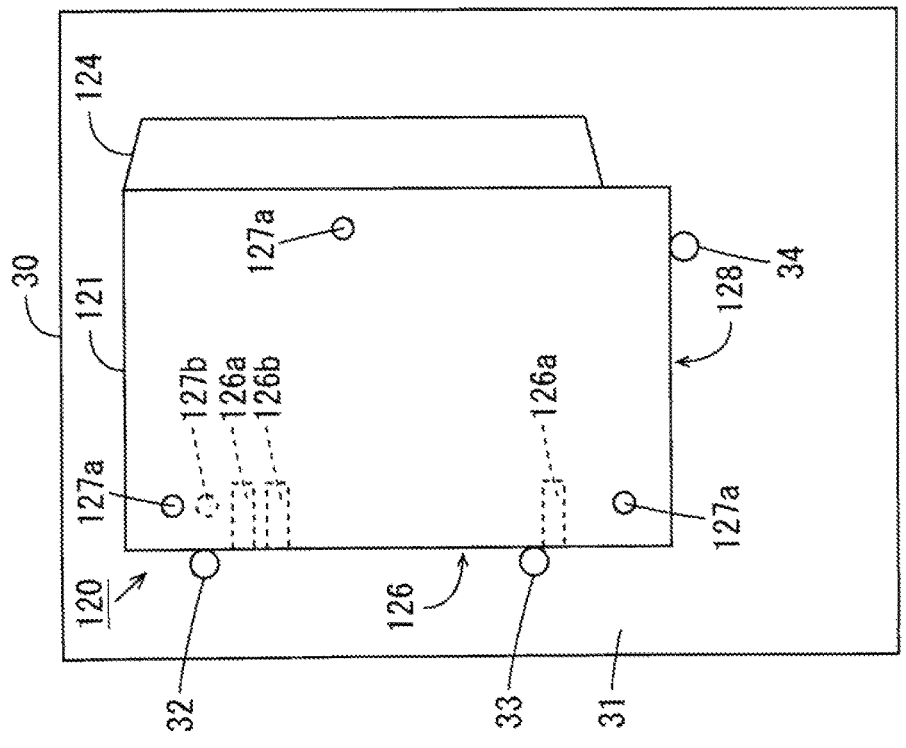

FIGS. 13A and 13B are diagrams for explaining a procedure for attaching the Y reference plane 127 of the housing unit 120 to the attachment instrument. As shown in FIG. 13A, an attachment instrument 30 includes an attachment surface 31. The Y reference plane 127 shown in FIG. 13B is set in contact with the attachment surface 31 such that the housing unit 120 faces a desired direction. In this state, two pins 32 and 33 are attached to the attachment surface 31 to be in contact with the X reference plane 126, whereby a measurement direction is determined. A pin 34 is attached to the attachment surface 31 to be in contact with the Z reference plane 128, whereby a measurement distance is determined.

A plurality of screw holes 35 respectively corresponding to the plurality of attachment holes 127a are formed in the attachment surface 31 after the determination of the measurement direction and the measurement distance. In an example shown in FIG. 13B, the screw holes 35 are bottomed holes but may be through holes. A substantially columnar protrusion section 36 corresponding to the locking hole 127b is formed in the attachment surface 31. A projection amount of the protrusion section 36 is slightly smaller than the depth of the locking hole 127b. The diameter of the protrusion section 36 is slightly smaller than the diameter of the locking hole 127b.

A plurality of fixing members 37 respectively corresponding to the plurality of screw holes 35 are prepared. The fixing members 37 are, for example, screw members. A nominal length of the fixing members 37 is larger than the depth of the attachment holes 127a corresponding to the fixing members 37 and smaller than a total of the depth of the screw holes 35 and the depth of the attachment holes 127a. In a state in which the protrusion section 36 is inserted into the locking hole 127b, the fixing members 37 are screwed in the screw holes 35 through the attachment holes 127a corresponding to the fixing members 37. Consequently, the Y reference plane 127 of the housing unit 120 is attached to the attachment instrument 30.

The posture of the housing unit 120 is adjusted such that the X reference plane 126 or the Y reference plane 127 is parallel to a desired direction in this way, whereby it is possible to easily set the shape measuring device 300 in a desired direction. The housing unit 120 is positioned such that the distance between the Z reference plane 128 and the measuring object S is a desired value, whereby it is possible to set the shape measuring device 300 in a state in which the distance to the measuring object S is easily maintained.

With this configuration, the measurement direction and the measurement distance of the measurement head 100 are not spatially limited by the attachment instruments 20 and 30. Therefore, it is possible to set the measurement head 100 in a production line of a factory or the like as an inspection device of products while easily maintaining an optimum measurement direction and an optimum measurement distance corresponding to the shape of the measuring object S. In the production line, it is possible to inspect, without being spatially limited by the attachment instruments 20 and 30, a plurality of measuring objects S automatically sequentially conveyed by a conveying device such as a belt conveyor.

When the X reference plane 126 of the housing unit 120 is attached to the attachment instrument 20, the protrusion section 26 engages in the locking hole 126b. Alternatively, when the Y reference plane 127 of the housing unit 120 is attached to the attachment instrument 30, the protrusion section 36 engages in the locking hole 127b. Consequently, an operator does not need to support the entire weight (e.g., 3 kg) of the housing unit 120 when attaching or detaching the housing unit 120. Consequently, a load on the operator decreases. It is possible to improve work efficiency. It is possible to prevent a drop and breakage of the housing unit 120 due to carelessness of the operator.

Pluralities of locking holes 126b and 127b may be provided. In this case, by forming pluralities of protrusion sections 26 and 36 in the attachment instruments 20 and 30 to correspond to the locking holes 126b and 127b, it is possible to surely lock the housing unit 120 to the attachment instruments 20 and 30. Even when the operator does not support the housing unit 120, the housing unit 120 is prevented from rotating on the attachment surfaces 21 and 31 of the attachment instruments 20 and 30. Consequently, the load on the operator further decreases. It is possible to further improve the work efficiency.

The locking holes 126b and 127b may be formed in an L-shape in section. In this case, it is possible to respectively insert hook-like protrusion sections 26 and 36 having the L-shape into the locking holes 126b and 127b. Consequently, it is possible to surely lock the housing unit 120 to the attachment instruments 20 and 30.

(8) Effects

In the shape measuring device 300 according to this embodiment, the movable section 141 and the balancing section 142 are supported by the supporting section 125. The measuring unit 130 excluding parts of the mirror 11 and the position detecting section 14 is attached to the movable section 141. The measurement light L1 emitted by the light projecting section 1 is guided to the measuring object S and the reference light L2 is guided to the mirror 10. The interference light L3 of the measurement light L1 reflected by the measuring object S and the reference light L2 reflected by the mirror 10 is guided to the light receiving section 2.

The movable section 141 is reciprocatingly moved by the driving unit 150, whereby the optical path length difference between the measurement light L1 and the reference light L2 changes. An interference pattern of a light receiving amount that changes according to the optical path length difference are acquired from each of the plurality of pixels of the light receiving section 2. Since the measurement light L1 and the reference light L2 have pluralities of peak wavelengths, the interference pattern of the light receiving amount does not show spatial periodicity. Therefore, it is possible to uniquely specify, with high accuracy, on the basis of the relative positions of the movable section 141 with respect to the supporting section 125 detected by the position detecting section 14 and the light receiving amounts of the pixels of the first light receiving section 2, surface shapes of portions of the measuring object S corresponding to the relative positions and the light receiving amounts.

In the light receiving section 2, since the plurality of pixels are two-dimensionally arrayed, the light receiving section 2 can simultaneously receive the interference light L3 including the measurement light L1 reflected by a plurality of portions of the measuring object S. For that reason, it is possible to acquire surface shapes of the plurality of portions of the measuring object S at high speed.

Further, the balancing section 142 is reciprocatingly moved by the driving unit 150 in the opposite direction of the movable section 141 with respect to the supporting section 125. In this case, even if the movable section 141 reciprocatingly moves, the position of the center of gravity of the shape measuring device 300 hardly changes. For that reason, the shape measuring device 300 does not unstably vibrate. It is unnecessary to increase the shape measuring device 300 in size and weight. It is possible to vibrate the movable section 141 at high speed and with large amplitude. As a result, it is possible to measure the surface shape of the measuring object S at high speed and with high accuracy in a wide measurement range while configuring the shape measuring device 300 compact.

In this embodiment, the light receiving section 2 specifies an envelope of the interference pattern of the light receiving amount concerning each of the plurality of pixels. The control board 160 specifies a peak position of the specified envelope. With this configuration, even when an interval of the optical path length difference at which the interference pattern should be acquired is not sufficiently dense but is rough, it is possible to specify the peak position of the interference pattern envelope. Consequently, it is possible to measure the surface shape of the measuring object S at high speed. The control board 160 does not need to specify the envelope of the interference pattern. Therefore, a load on the control board 160 is reduced. It is possible to prevent the operation speed of the control board 160 from decreasing.

In this embodiment, the control board 160 performs various kinds of arithmetic processing and control. However, the present invention is not limited to this. Parts or all of the arithmetic processing and the control of the control board 160 may be performed by the control unit 210 of the processing device 200. When heat generation of the control board 160 is small, the control housing 122, the connecting section 123, and the covering section 124 may be not provided in the housing unit 120. The control board 160 may be housed in the measurement housing 121.

(9) Other Embodiments

In the embodiment, the measuring unit 130 is configured such that the optical path length of the measurement light L1 changes and the optical path length of the reference light L2 does not change. However, the present invention is not limited to this. The measuring unit 130 may be configured such that the optical path length of the reference light L2 changes and the optical path length of the measurement light L1 does not change. In this case, the mirror 10 is configured to vibrate relatively to the beam splitter 12 along a traveling direction of the reference light L2.

(10) Correspondence Relation Between the Constituent Elements of Claims and the Sections of the Embodiment An example of correspondence of the constituent elements of claims and the sections and the sections of the embodiment is explained below. However, the present invention is not limited by the example explained below.

In the embodiment, the measuring object S is an example of the measuring object. The shape measuring device 300 is an example of the shape measuring device. The light projecting section 1 is an example of the light projecting section. The mirror 10 is an example of the reference body. The light receiving sections 2 and 3 are respectively examples of the first and second light receiving sections. The measurement light L1 is an example of the measurement light. The reference light L2 is an example of the reference light. The interference light L3 is an example of the interference light. The beam splitter 12 is an example of the optical system.

The movable section 141 is an example of the movable section. The supporting section 125 is an example of the supporting section. The position detecting section 14 is an example of the position detecting section. The control board 160 is an example of the shape acquiring section. The balancing section 142 is an example of the balancing section. The driving units 150 and 145 are respectively examples of the first and second driving sections. The elastic member 146 is an example of the elastic member and the spring member. The reciprocating mechanism 140 is an example of the reciprocating mechanism. The sliding sections 144A, 144B, and 144C are respectively examples of the first, second, and third sliding sections.

The plate section 143 is an example of the plate section. The rolling member 144c is an example of the rolling member. The flat sections 143a, 143b, and 143c are respectively examples of the first, second and third portions. The measurement period T1 is an example of the first and third periods. The non-measurement period T2 is an example of the second and fourth periods. The guide lights G1 and G2 are respectively examples of the first and second guide lights. The guide section 16 is an example of the guide section. The anamorphic prism pair 13 is an example of the shaping member.

As the constituent elements of claims, other various elements having the configurations or the functions described in claims can also be used.

The present invention can be effectively used in various shape measuring devices.

What is claimed is:

1. A shape measuring device that measures a surface shape of a measuring object, the shape measuring device comprising:
a light source configured to emit light having a plurality of peak wavelengths;
a reference body;
a first light receiver including a two-dimensionally arrayed plurality of pixels;
an optical system configured to guide the light emitted by the light source to the measuring object as measurement light, guide the light emitted by the light source to the reference body as reference light, generate interference light of the measurement light reflected by the measuring object and the reference light reflected by the reference body, and guide the generated interference light to the first light receiver;
a movable base to which at least one of the optical system and the reference body is attached, the movable base reciprocatingly moving to thereby change a difference between an optical path length of the measurement light and an optical path length of the reference light;
a supporting base configured to support the movable base to be capable of reciprocatingly moving;
a position detector configured to detect relative positions of the movable base with respect to the supporting base;
a shape acquiring section configured to acquire surface shapes of a plurality of portions of the measuring object on the basis of the relative positions detected by the position detector and light receiving amounts of the plurality of pixels of the first light receiver;
a balancer supported to be capable of reciprocatingly moving with respect to the supporting base; and
a first driver configured to reciprocatingly move the movable base and the balancer with respect to the supporting base in opposite directions each other.

2. The shape measuring device according to claim 1, wherein the light source emits light having coherency higher than the coherency of white light and lower than the coherency of laser light.

3. The shape measuring device according to claim 1, further comprising an elastic member configured to connect the movable base and the balancer.

4. The shape measuring device according to claim 3, wherein
a reciprocating mechanism is configured by the elastic member, the movable base, and the balancer, and
a spring constant of the elastic member is set such that a natural frequency of the reciprocating mechanism is in a fixed range from a vibration frequency of the reciprocating mechanism.

5. The shape measuring device according to claim 1, wherein the first driver is attached between the movable base and the balancer to be mechanically insulated from the supporting base.

6. The shape measuring device according to claim 1, further comprising first and second sliders configured to be capable of sliding in parallel to one direction, wherein
the movable base and the balancer are respectively attached to the supporting base via the first and second sliders to be capable of reciprocatingly moving.

7. The shape measuring device according to claim 6, further comprising:
a third slider configured to be capable of sliding in parallel to one direction;
a plate supported to be capable of reciprocatingly moving with respect to the supporting base; and
a second driver configured to reciprocatingly move the plate with respect to the supporting base, wherein
each of the first, second, and third sliders is a linear motion bearing,
the first slider is provided in the movable base and on one surface of the plate,
the second slider is provided in the balancer and on the one surface of the plate,
the third slider is provided on the other surface of the plate and in the supporting base, and
the second driver reciprocatingly moves the plate such that a rolling member in each of the first, second, and third sliders rolls one round or more.

8. The shape measuring device according to claim 7, wherein
the plate includes first, second, and third portions,
an interval between one surface of the first portion and the movable base is larger than an interval between one surface of the third portion and the movable base,
an interval between one surface of the second portion and the balancer is larger than an interval between the one surface of the third portion and the balancer,
an interval between the other surface of the third portion and the supporting base is larger than an interval between the other surface of the first portion and an interval between the other surface of the second portion and the supporting base,
the first slider is provided on the one surface of the first portion,
the second slider is provided on the one surface of the second portion, and the third slider is provided on the other surface of the third portion.

9. The shape measuring device according to claim 7, wherein cycles of the reciprocating movement of the movable base include a first period in which the plurality of pixels of the first light receiver receive the interference light and a second period in which the plurality of pixels of the first light receiver do not receive the interference light, and
    the second driver moves the plate in the second period and stops the movement of the plate in the first period.

10. The shape measuring device according to claim 1, further comprising a guide emitter configured to emit first and second guide lights, wherein
    the guide emitter is disposed such that, when a surface of the measuring object is present in a position of a focal point of the first light receiver, a pattern of the first guide light and a pattern of the second guide light projected on the surface of the measuring object have a specific positional relation.

11. The shape measuring device according to claim 10, wherein cycles of the reciprocating movement of the movable base include a third period in which the plurality of pixels of the first light receiver receive the interference light and a fourth period in which the plurality of pixels of the first light receiver do not receive the interference light, and
    the guide emitter emits the first and second guide lights in the third period and stop the emission of the first and second guide lights in the fourth period.

12. The shape measuring device according to claim 1, further comprising a shaping member configured to transmit the light emitted by the light source while shaping a pattern of the light into a circular shape.

13. The shape measuring device according to claim 12, further comprising a second light receiver configured to receive reflected light from the shaping member and detect a light receiving amount.

14. The shape measuring device according to claim 1, wherein the position detector is configured to further detect an absolute position of the movable base.

15. The shape measuring device according to claim 1, wherein
    the first light receiver specifies, concerning each of the plurality of pixels, an envelope of an interference pattern of the light receiving amount that changes according to the difference between the optical path length of the measurement light and the optical path length of the reference light, and
    the shape acquiring section specifies a peak position of the envelope specified by the first light receiver and acquires surface shapes of a plurality of portions of the measuring object on the basis of the specified peak position.

* * * * *